(12) United States Patent
Dawani et al.

(10) Patent No.: US 10,469,595 B2
(45) Date of Patent: Nov. 5, 2019

(54) SYSTEM AND METHOD OF DYNAMIC ESTABLISHMENT OF VIRTUAL PRIVATE NETWORKS USING BORDER GATEWAY PROTOCOL ETHERNET VIRTUAL PRIVATE NETWORKS TECHNOLOGY

(71) Applicant: Arista Networks, Inc., Santa Clara, CA (US)

(72) Inventors: Anoop Dawani, San Jose, CA (US); James Michael Murphy, Alameda, CA (US); Udayakumar Srinivasan, Fremont, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 244 days.

(21) Appl. No.: 15/436,670

(22) Filed: Feb. 17, 2017

(65) Prior Publication Data

US 2018/0241823 A1  Aug. 23, 2018

(51) Int. Cl.
*H04L 29/08* (2006.01)
*H04L 12/46* (2006.01)
*H04L 29/06* (2006.01)

(52) U.S. Cl.
CPC ........ *H04L 67/141* (2013.01); *H04L 12/4633* (2013.01); *H04L 12/4641* (2013.01); *H04L 63/0272* (2013.01)

(58) Field of Classification Search
CPC ............... H04L 67/141; H04L 12/4633; H04L 12/4641; H04L 63/0272
USPC ......................................... 709/220, 227, 228
See application file for complete search history.

(56) References Cited

U.S. PATENT DOCUMENTS

2014/0201374 A1 * 7/2014 Ashwood-Smith ..... H04L 49/70
  709/226
2016/0285761 A1 * 9/2016 Dong ................... H04L 12/4666

FOREIGN PATENT DOCUMENTS

WO   WO-2008092351 A1 *  8/2008 ............. H04L 12/66

* cited by examiner

*Primary Examiner* — Chirag R Patel
*Assistant Examiner* — Marshall M McLeod
(74) *Attorney, Agent, or Firm* — Womble Bond Dickinson (US) LLP (57) ABSTRACT

A method and apparatus of a network element that dynamically establishes a first virtual private network (VPN) tunnel is described. In an exemplary embodiment, the network element detects data destined for a first private subnet. In response to the detecting, the network element determines that a next hop for the data does not have an established VPN tunnel that allows access to the first private subnet. The network element further establishes the VPN tunnel and sends the data using the VPN tunnel.

18 Claims, 11 Drawing Sheets

SYSTEM AND METHOD OF DYNAMIC ESTABLISHMENT OF VIRTUAL PRIVATE NETWORKS USING BORDER GATEWAY PROTOCOL ETHERNET VIRTUAL PRIVATE NETWORKS TECHNOLOGY

FIELD OF INVENTION

This invention relates generally to data networking, and more particularly, to dynamically establishing Virtual Private Networks (VPNs) between network elements.

BACKGROUND OF THE INVENTION

A large enterprise can have many hundreds or thousands of branch offices or retail sites and one or more centralized data centers that service these sites. Each of these sites has a branch router and each central data center site has one or more hub network elements. Such a large enterprise would like to use the Internet to carry traffic between these sites to reduce the cost versus traditional multi-protocol label switching (MPLS) virtual private networks (VPNs). Because the traffic is carried over the public Internet, the traffic is secured, typically using Internet Protocol Security (IPSec) tunnels. Given thousands of branch network elements in the network, the establishment of IPSec security associations between each branch office and/or retail site is a considerable configuration and management scaling issue, as each IPSec tunnel needs to be configured separately on each possible router pair. When one new branch router is added to the mix, all the remaining network elements must be updated to learn of the new router. Furthermore, the establishment and management of thousands of IPSec security associations increases the scaling requirements of the network elements themselves in terms of the number of security associations they can maintain and the computational resources required to maintain those associations.

However, branch-to-branch traffic is something quite rare. A given branch might be actively communicating with a small fraction (less than 10%) of the other branch network elements. So many of the resources allocated to establish and maintain the IPSec associations are not put to use.

A second issue, and a weakness with existing IPSec tunnel solutions, is that IPSec tunnels are not multi-tenant in nature. To support multiple virtual routing and forwarding (VRF) instances in a branch network element, a separate IPSec tunnel is provisioned to handle each VRF instance. Thus, customers are forced to potentially configure multiple IPSec tunnels to handle the multitude of VRFs maintained at each site.

SUMMARY OF THE DESCRIPTION

A method and apparatus of a network element that dynamically establishes a virtual private network (VPN) tunnel is described. In an exemplary embodiment, the network element detects data destined for a first private subnet. In response to the detecting, the network element determines that a next hop for the data does not have an established VPN tunnel that allows access to the first private subnet. The network element further establishes the VPN tunnel and sends the data using the VPN tunnel.

Other methods and apparatuses are also described.

BRIEF DESCRIPTION OF THE DRAWINGS

The present invention is illustrated by way of example and not limitation in the Figures of the accompanying drawings in which like references indicate similar elements.

DETAILED DESCRIPTION

A method and apparatus of a network element that dynamically establishes a VPN tunnel is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that dynamically establishes a VPN tunnel is described. In one embodiment, a network includes a hub network elements for a data center that services multiple branch offices. Each of the branch offices includes a branch network element that provides network access for the network of the branch office. The network elements in the network run Border Gateway Protocol (BGP) Ethernet Virtual Private Network (EVPN). In addition, a subset of network elements can act as Route Reflectors for the branch and hub network elements. When the branch network elements come up, the branch network elements establish an Internet Protocol Security (IPSec) tunnel between the branch network element and a security server at the corporate data center. A BGP session is run over the secure tunnel between the branch router and one or more route reflectors. The branch network element advertises the IP (Internet Protocol) prefixes that the branch network element has reachability and the BGP Next-Hop for these prefixes is the Public IP address of the Branch Router. Furthermore, the hub network element advertises IP prefixes for which this hub network element has reachability using the public IP address of the hub network element as the BGP Next-Hop. In one embodiment, these advertisements are made using BGP EVPN encodings. The Router Reflector can redistribute this information to the other hub and branch network elements in the network.

In one embodiment, for traffic forwarding, there are initially no secure sessions established between branch network elements. Instead, these inter-branch network element secure sessions are established dynamically, as not all of the possible inter-branch network element secure sessions are always needed. In this embodiment, each VPN Prefix for another branch office network points to a special next-hop that forces the packet to be forwarded to the control plane of branch network element. The control plane computes that the packet should be forwarded to a Public BGP Next-Hop. This alerts the control plane of two things. First, that the branch network element establishes an IPSec transport session between branch network element and the indicated branch peer (e.g., the other branch network element), and second that the branch network element computes a Virtual Extended Local Area Network (VXLAN) next-hop encapsulation for this branch peer. With the IPSec transport session is established, the control plane configures the forwarding path for this branch peer with the proper VXLAN tunnel and IPSec transport mode next-hop information and associates this information with the IP Prefixes and VPNs advertised by the specified branch peer. Note that, in one embodiment, IPSec transport mode can be used rather than tunnel mode because IPSec tunnel mode would be redundant with the VXLAN tunnel encapsulation. Alternatively, the secure sessions can be established using Generic Routing Encapsulation (GRE) with GRE keys, MPLS labels, or another type of tunneling mechanism.

In a further embodiment, this IPSec transport session and VXLAN next-hop can be removed from the forwarding plane after a suitable amount of time has passed since the most recent packet was sent through this next-hop (or alternatively, a low level of traffic is detected being used by the IPSec session), thereby providing a mechanism to age out unused security associations.

When the IPSec session is established, any number of authentication mechanisms can be used including pre-shared keys and certificates. The IPSec peers can also be configured with the identity of a centralized authentication server to help to scale the deployment. This information can be loaded on the branch router via a suitable configuration mechanism including the use of a zero-touch provisioning mechanism.

In one embodiment, as described herein, the IP prefixes are distributed via BGP VXLAN, which is referred to as EVPN route type 5. In another embodiment, other route types, specifically Layer 2 route types are used to distribute the IP prefixes. In addition, the network elements participating in this system and method could be constructed as virtual machines running in a Private Cloud, such as Amazon VPC (AWS), Google Compute Engine, Microsoft Azure, etc.

Figure 1:
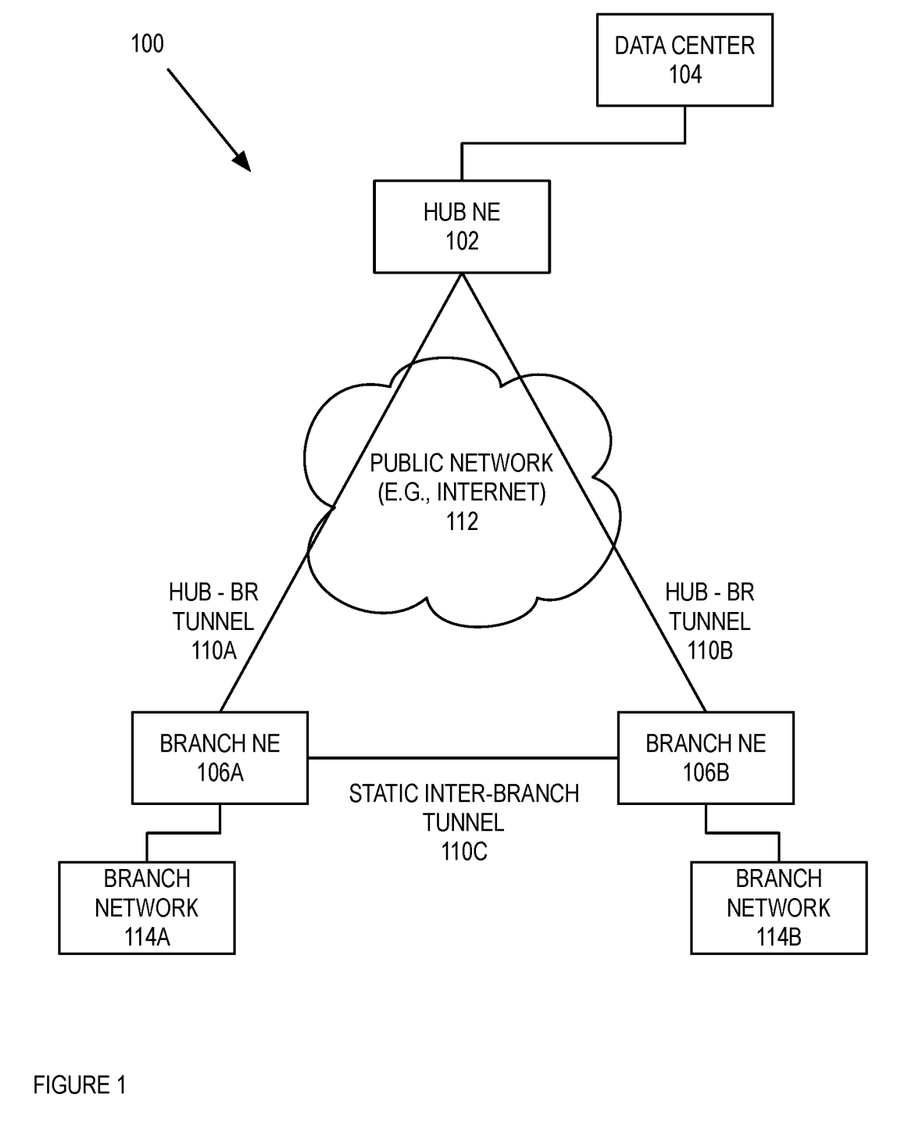
FIG. 1 is a block diagram of one embodiment of a network with two branch network elements communicating with a data center via a hub router using tunnels.

FIG. 1 is a block diagram of one embodiment of a network 100 with two branch network elements 106A-B communicating with a data center 104 via a hub network element 102 using tunnels 110A-C. In FIG. 1, the network 100 includes two branch network elements 106A-B coupled to a hub network element 102, and the hub network element 102 is coupled to a data center 104. In one embodiment, the hub network element 102 gives network access to data center 104 for the branch network elements 106A-B. In one embodiment, each of the network elements 106A-B and 102 is a device that provides network access to a network (e.g., physical network, virtualized network, etc.). A network element can be a switch, router, hub, bridge, gateway, etc., or any type of device that can allow access to a network. In one embodiment, each of the network elements 106A-C can be a virtual machine. While in one embodiment, the network 100 includes two branch network elements 106A-B, one hub network element 102, and one data center 104, in alternate embodiments there can be more or less branch or hub network elements and/or data centers (e.g., thousands of branch network elements, multiple hub network element, and 2-4 data centers). In one embodiment, each of the branch network elements 106A-B gives network access to a respective branch network 114A-B. In this embodiment, the branch network 114A-B is a network for the branch office.

In one embodiment, the data center 104 is a main data center for the enterprise that uses network 100. In this embodiment, the data center 104 can include up to thousands (or more) of computing devices and network elements that are used for the enterprise functions. The hub network element 102 is one or more network elements for the data center 104 that is used to give access to the data center 104 for various branches in the network 100. In addition, each branch of the enterprise can be a satellite office (e.g., a branch office for a financial institution or other commercial enterprise) that periodically uses network access to the data center 104 for various business functions.

In order to have secure communications between the branches in the data center 104, tunnels are established so that the communication between the branches in the data center are protected. In one embodiment, a tunnel is set up between each of the branch network elements 106A-B and a security server of the data center. In one embodiment, the security server can be part of the hub network element 102 or another device. While in one embodiment, each of the tunnels 110A-B is an Internet Protocol Security (IPSec) tunnels, in alternate embodiments, each of the tunnels 110A-B can be a different type of tunnel (e.g., GRE with GRE keys, MPLS labels, or another type of tunneling mechanism). In this embodiment, the tunnels 110A-B are established across a public IP network (e.g., the Internet).

In one embodiment, the majority of the communications involved with each of the branch network elements 106A-B will involve communications between the respective branch network element 106A-B and the hub network element 102. Periodically, a device in the branch network 114A-B will need to communicate with another device in a different branch network 114A-B. In order for device in, say, branch network 114A to securely communicate with another device and branch network 114B, a tunnel between branch network element 106A and branch network element 106B is established when these network elements 106A-B are brought up. By having a tunnel between these two network elements 106A-B, the device and branch network 114A can securely communicate with another device in branch network 114B.

The problem with having tunnels established between branch network elements 106A-B, as the number of branch networks and corresponding branch network elements increase, the number of tunnels required for a full mesh increases quadratically. For example, and in one embodiment, if there are N branch networks and corresponding branch network elements, the number of tunnels required for full mesh between these branch networks is N(N−1)/2. Thus, if there are 2000 branch networks with the corresponding branch network elements, the number of tunnels required is 1,999,000! This can lead to a large number of tunnels very quickly. Furthermore, inter-branch network communication can be rare, where branches that are geographically distinct or branches that do not work together often may not need dedicated tunnels all the time. Because it is hard to predict, a priori, which tunnels are needed between the different branches, it makes sense to set up a full mesh of tunnels between the different branches in the network 100.

Figure 2:
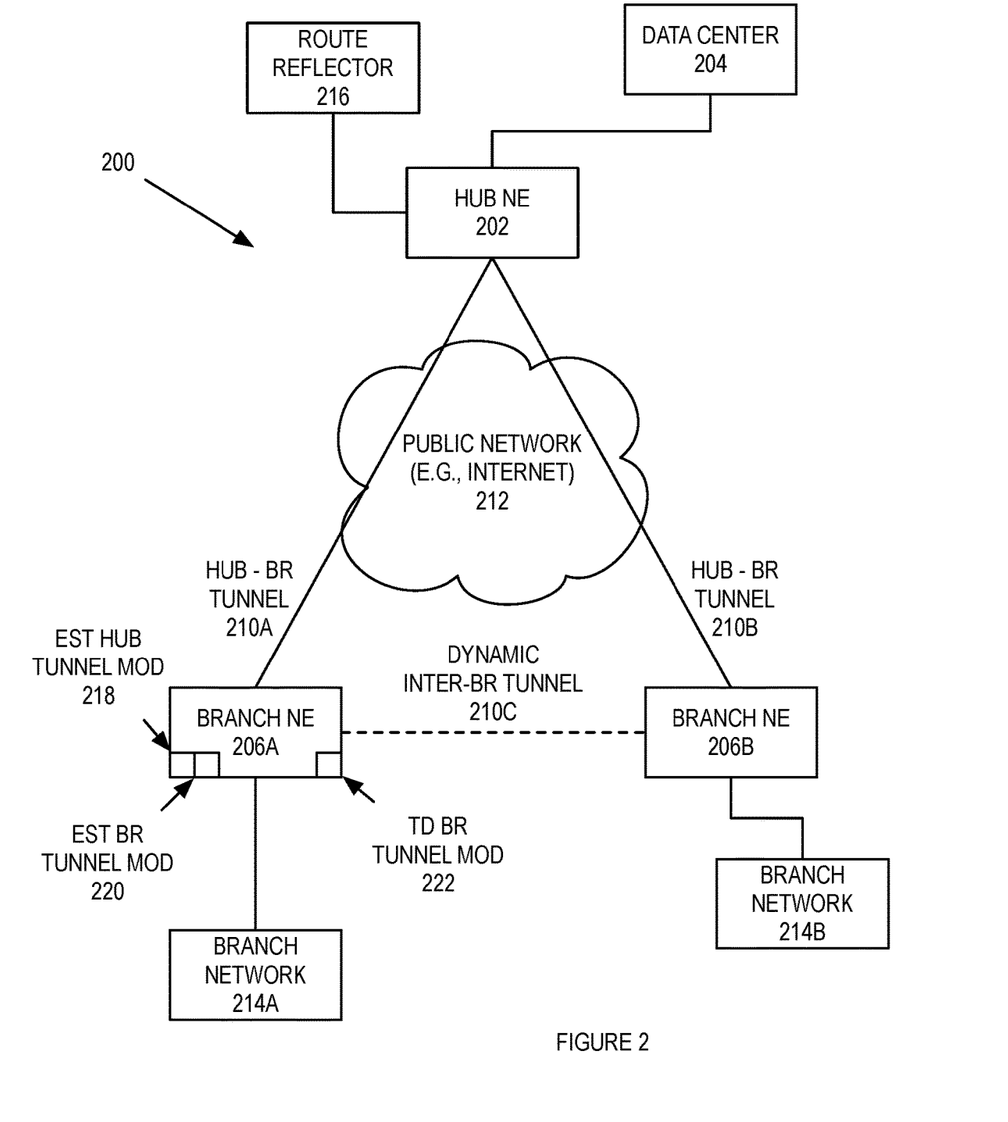
FIG. 2 is a block diagram of one embodiment of a network with two branch network elements communicating with a data center via a hub router using tunnels using a dynamic VPN between the branch network elements.

FIG. 2 is a block diagram of one embodiment of a network with two branch network elements communicating with a data center via a hub router using tunnels using a dynamic VPN between the branch network elements. In FIG. 2, the network 200 includes two branch network elements 206A-B coupled to a hub network element 202, where the hub network element 202 is coupled to the data center 204. As in FIG. 1, the hub network element 202 provides network access to the data center 204 for the branch network elements 206A-B and the corresponding branch networks 214 A-B. In one embodiment, each of the network elements 206A-B and 202 is a device that provides network access to a network (e.g., physical network, virtualized network, etc.). A network element can be a switch, router, hub, bridge, gateway, etc., or any type of device that can allow access to a network. In one embodiment, each of the network elements 206A-C can be a virtual machine. While in one embodiment, the network 200 includes two branch network elements 206A-B, one hub network element 202, and one data center 204, in alternate embodiments there can be more or less branch or hub network elements and/or data centers (e.g., thousands of branch network elements, multiple hub network element, and 2-4 data centers). In one embodiment, each of the branch network elements 206A-B gives network access to a respective branch network 214A-B. In this embodiment, the branch network 214A-B is a network for the branch office.

In one embodiment, instead of provisioning each of the inter-branch tunnels for each pair of branches when the branch network elements are brought up in the network 200, the inter-branch tunnels are dynamically provisioned. In this embodiment, when a branch network element 206A-B is brought up, a secure tunnel is established between the hub network element 202 in the branch network element 206A-B. The secure tunnel can be, for example, an IPSec tunnel, or a GRE or VXLAN tunnel secured via IPSec transport mode or datagram transport layer security (DTLS), or another type of tunnel. Furthermore, secure tunnels can carry a virtual network identifier to demultiplex the packet into the proper virtual routing and forwarding (VRF) instance. Examples include the VXLAN virtual network identifier (VNI), GRE keys or MPLS labels. With the tunnel established, a route reflector 216, that is coupled to the hub network element 202, sends routes for known IP prefixes of other established branch networks to the branch network element. For example and in one embodiment, if branch network element 206A is brought up, a hub branch network element tunnel 210A is established between the hub network element 202 and the branch network element 206A. With this tunnel 210A established, the route reflector 216 sends known IP prefixes for other branch networks to the branch network element 206A. In one embodiment, the route reflector 216 sends the known IP prefixes in response to a request from the branch network element 206A. The branch network element 206A installs the known IP prefixes in the forwarding information base (FIB) of that branch network element 206A. In the FIB, each of these known IP prefixes will have an unresolved next hop as the dynamic tunnel 210C is not established at this point. While in one embodiment, the route reflector 216 is one or more device separate from the hub network element 202, in alternate embodiments, the router reflector 216 is part of the hub network element 202.

For example and in one embodiment, each of the network elements in the network run BGP EVPN. There is a subset of network elements that act as route reflectors for the branch and hub network elements, such as route reflector 216. When the branch network element comes up (e.g., branch network element 206A), the branch network element establishes a secure tunnel (e.g., tunnel 210A) between themselves and a security server at the corporate data center. While in one embodiment, the security server (not illustrated) is one or more device separate from the hub network element 202, in alternate embodiments, the security server is part of the hub network element 202. A BGP session is run over the IPSec tunnel between the branch network element and one or more route reflectors 216. Branch network elements advertise the IP prefixes for which they have reachability and the BGP Next-Hop for these prefixes is the Public IP address of the Branch Router. In addition, the hub network element 202 advertises IP prefixes for which they have reachability using their public IP address as the BGP Next-Hop. These advertisements are made using BGP EVPN encodings. The Router Reflectors redistribute this information to the hub 202 and branch network elements 206A-B in the network. Bringing up a branch network element 206A-B is further described in FIG. 4 below. In one embodiment, the branch network element 206A that is used to bring up the branch network element 206A.

In one embodiment, if data is to be communicated between branches 206A-B that do not have the inter-branch tunnel established 210C, and the inter-branch tunnel 210C is established so as to communicate the data. In this embodiment, if branch network element 206A receives a packet destined for branch network 214B, branch network element 206A looks up the next hop for this packet in the FIB of the branch network element 206A. Because there is no tunnel 210C established at this point, the next hop is a special next hop that forces the packet to be forwarded to the control plane of the branch network element 206A. The control plane establishes the tunnel 210C and forwards the packet over this tunnel to branch network element 206B.

For example and in one embodiment, there are initially no secure tunnels established between branch network elements 206A-B. Each VPN Prefix in the FIB of branch network element 206A points to a special next-hop that forces the packet to be forwarded to the control plane of the branch network element 206A. In one embodiment, the branch network element 206A (or 206B) copies the packet to be forwarded to the control plane of that network element. The control plane computes that the packet should be forward to a Public BGP Next-Hop. In this embodiment, the Public BGP Next-Hop is the hub network element 202, which allows the packet to flow to the corresponding other branch network element (via the hub) while the secure tunnel is being established to the other branch network element. In this embodiment, this alerts the control plane of two things. One, that the branch network element 206A is to establish an IPSec transport session between the branch network elements 206A and the indicated peer (e. g., branch network element 206B) and, two, that branch network element 206A computes a VXLAN next-hop encapsulation for said peer. After the IPSec transport session is established, the control plane configures the forwarding path with the proper VXLAN tunnel and IPSec transport mode next-hop information and associates this information with the IP Prefixes and VPNs advertised by the specified peer. In this example, an IPSec transport mode rather than tunnel mode is used because IPSec tunnel mode would be redundant with the VXLAN tunnel encapsulation. Dynamically establishing the inter-branch VPN tunnels is further described in FIG. 5 below. In one embodiment, the branch network element 206A includes establish branch tunnel module 220 that is used to establish the inter-branch VPN tunnels.

In a further embodiment, this IPSec transport session and VXLAN next-hop can be removed from the forwarding plane after a suitable amount of time has passed since the most recent packet was sent through this next-hop (or alternatively, a low level of traffic is detected being used by the IPSec session), thereby providing a mechanism to age out unused security associations. Tearing down an inter-branch VPN tunnel is further described in FIG. 6 below. In one embodiment, the branch includes tear down branch tunnel module 222 that is used to tear down the inter-branch VPN tunnels. While not illustrated, the branch network element 206B can further include establish hub tunnel module, establish branch tunnel module, and/or tear down branch tunnel module as described above.

When the IPSec session is established, any number of authentication mechanisms can be used including pre-shared keys and certificates. The IPSec peers can also be configured with the identity of a centralized authentication server to help to scale the deployment. This information can be loaded on the branch router via a suitable configuration mechanism including the use of a zero-touch provisioning mechanism.

While in one embodiment, the dynamic establishment of VPNs is illustrated between branch network elements, in alternate embodiments, the dynamic establishment of VPNs can be performed between network elements that are not necessarily branch network elements. In this embodiment, two network elements (network elements A and B that give access to network A and B, respectfully) could receive the IP prefixes for the other networks from a route reflector. For example and in one embodiment, network element A and B could receive IP prefixes for networks B and A, respectively.

Furthermore, if enough traffic is being generated for the network served by the other network element, a dynamic VPN can be established as described above. In this example, if the network element A receives traffic for network B (or enough traffic to trigger the dynamic VPN establishment), a dynamic VPN establishment is established as described above.

Figure 3:
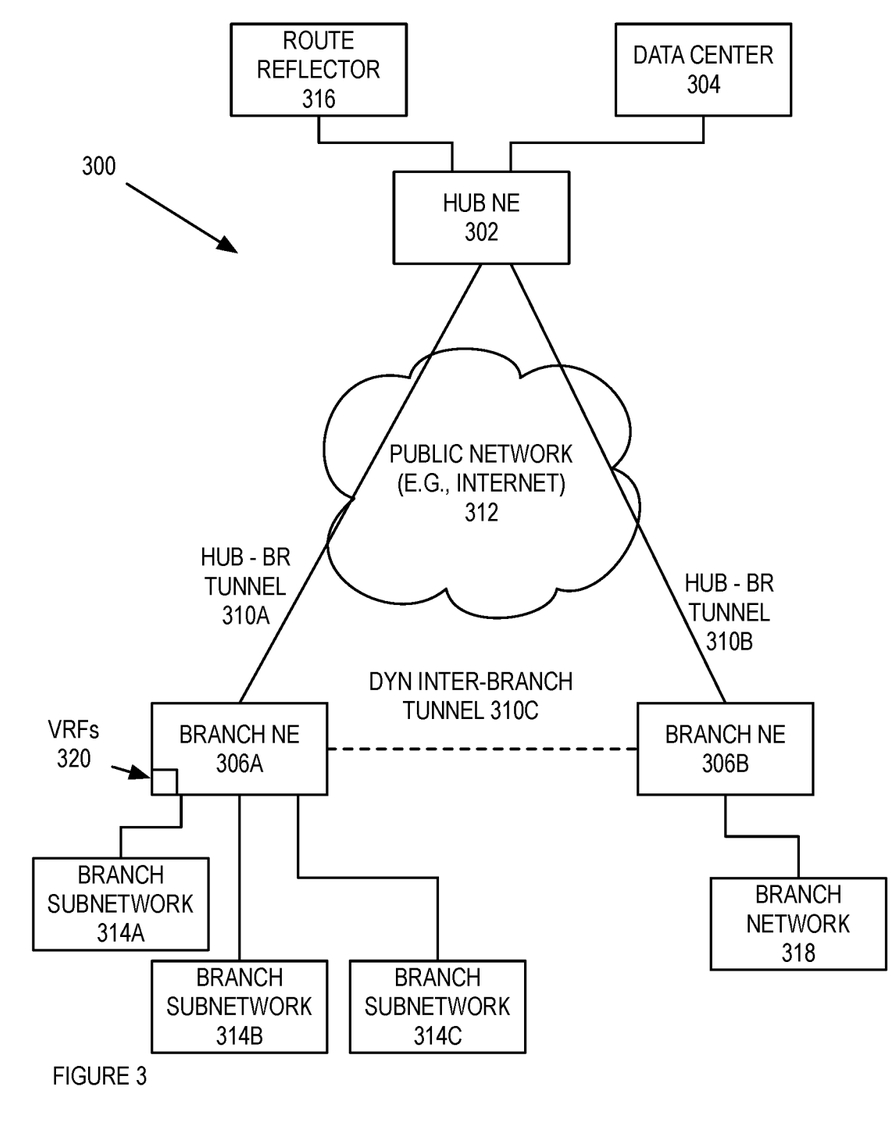
FIG. 3 is a block diagram of one embodiment of a network with two branch network elements communicating with a data center via a hub router using tunnels using a dynamic VPN between the branch network elements and supporting multiple virtual routing and forwarding (VRF) instances.

FIG. 3 is a block diagram of one embodiment of a network with two branch network elements communicating with a data center via a hub router using tunnels using a dynamic VPN between the branch network elements and supporting multiple virtual routing and forwarding (VRF) instances. In FIG. 3, the network 300 includes two branch network elements 306A-B coupled to a hub network element 302, where the hub network element 302 is coupled to the data center 304. As in FIG. 1, the hub network element 302 provides network access to the data center 304 for the branch network elements 306A-B and the corresponding branch networks 314 A-B. In one embodiment, each of the network elements 306A-B and 302 is a device that provides network access to a network (e.g., physical network, virtualized network, etc.). A network element can be a switch, router, hub, bridge, gateway, etc., or any type of device that can allow access to a network. In one embodiment, each of the network elements 306A-C can be a virtual machine. While in one embodiment, the network 300 includes two branch network elements 306A-B, one hub network element 302, and one data center 304, in alternate embodiments there can be more or less branch or hub network elements and/or data centers (e.g., thousands of branch network elements, multiple hub network element, and 2-4 data centers). In one embodiment, branch network element 306B gives network access to a respective branch network 314B. In this embodiment, the branch network 314B is a network for the branch office. In addition, network 300 includes route reflector 316, which redistributes the routing information as described above in FIG. 2.

In one embodiment, branch network element 306A is coupled to the three subnetworks of the branch 314A-C. In one embodiment, the different subnetworks 314A-C are subdivisions of the network for the branch office serviced by branch network element 306A. For example and in one embodiment, there could be a branch subnetwork for a guest subnetwork 314 A, company prefixes subnetwork 314B, a network management subnetwork 314C. to support these different subnetworks 314A-C, the branch network element 306A includes multiple virtual routing and forwarding instances (VRFs) for each of the different subnetworks 314A-C. In one embodiment, the branch network element 306A can dynamically establish the secure tunnel 310C to support each of the different branch subnetworks 314A-C. For example and in one embodiment, if branch network element 306A receives a packet from branch subnetwork 314B destined for branch network 318, the branch network element 306A would establish a secure tunnel with a VRF for this branch subnetwork 314B. In one embodiment, by using VXLAN as the tunneling mechanism, the branch network element 306A can support many VRFs over a single IPSec session. In this embodiment, IPSec tunnel mode does not include a VNI, whereas VXLAN does include a VNI. This allows the branch network element 306A to make use of different VNIs for different subnetworks such as 314A-C known to the branch network element 306A. On a network element, a VRF is defined by a set of interfaces configured on this network element, where one or some of these interfaces can be virtual. A VRF, however, is not defined by prefixes and this allows for overlapping prefixes across VRFs. For example and in one embodiment, for branch network element 306A, a VRF would be defined by the interface connecting 306A to branch subnetwork 314A. This VRF would include routes received from the route reflector 316 that include routes to the hub network element 302 and other branch network elements that are also members of this VRF as defined by having interfaces in that VRF.)

Figure 4:
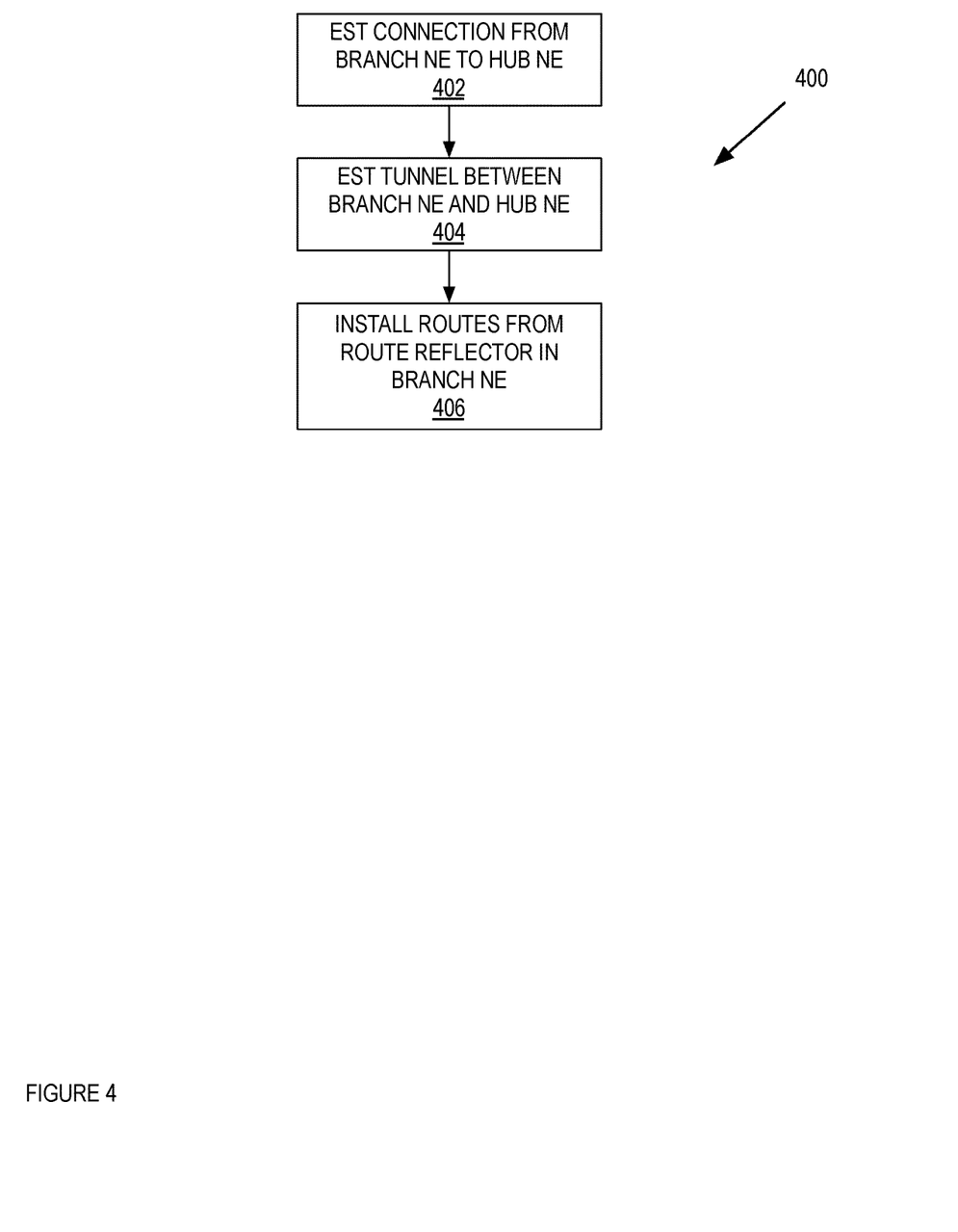
FIG. 4 is a flow diagram of one embodiment of a process to establish a tunnel between a branch network element and hub router.

FIG. 4 is a flow diagram of one embodiment of a process 400 to establish a tunnel between a branch network element and hub router. In one embodiment, process 400 is performed by an established hub tunnel module to establish a tunnel between a branch network element and a hub network element, such as the hub tunnel module 218 as described in FIG. 2 above. In FIG. 4, process 400 begins by establishing a connection from the branch network element to the hub network element at block 402. In one embodiment, the branch network element is delivered with a minimal configuration such that process 400 can obtain an IP address and access the Internet by one of interfaces of the branch network element, establish a tunnel to the hub network element, and connect to a network management station to download the configuration for this branch network element. This configuration can include interface and routing protocol configuration for BGP over IPSec tunnel to the hub network element, interface and routing protocol configuration for locally attached networks, and other types of configuration for the branch network element. In addition, process 400 advertises the local private prefixes for the branch network element. At block 404, process 400 establishes the tunnel between the branch network element and the hub network element. In one embodiment, process 400 establishes an IPSec tunnel, in alternate embodiments, process 400 can establish a different type of tunnel.

At block 406, process 400 receives routes from a route reflector and installs those routes into the branch network element. In one embodiment, process 400 uses a BGP session that is run over the tunnel between the branch network element and the route reflector because the other branch network elements advertise their IP prefixes for which they have reachability, the routes received from the route reflector include a BGP next hop for these prefixes, which is the public IP address of the branch network element. In addition, the hub network element advertises IP prefixes for which the hub network element has reachability using the public IP address as the BGP next top. In one embodiment, these advertisements are made using BGP EVPN encodings. In one embodiment, process 400 installs the received routes into the FIB of the branch network element.

Figure 5:
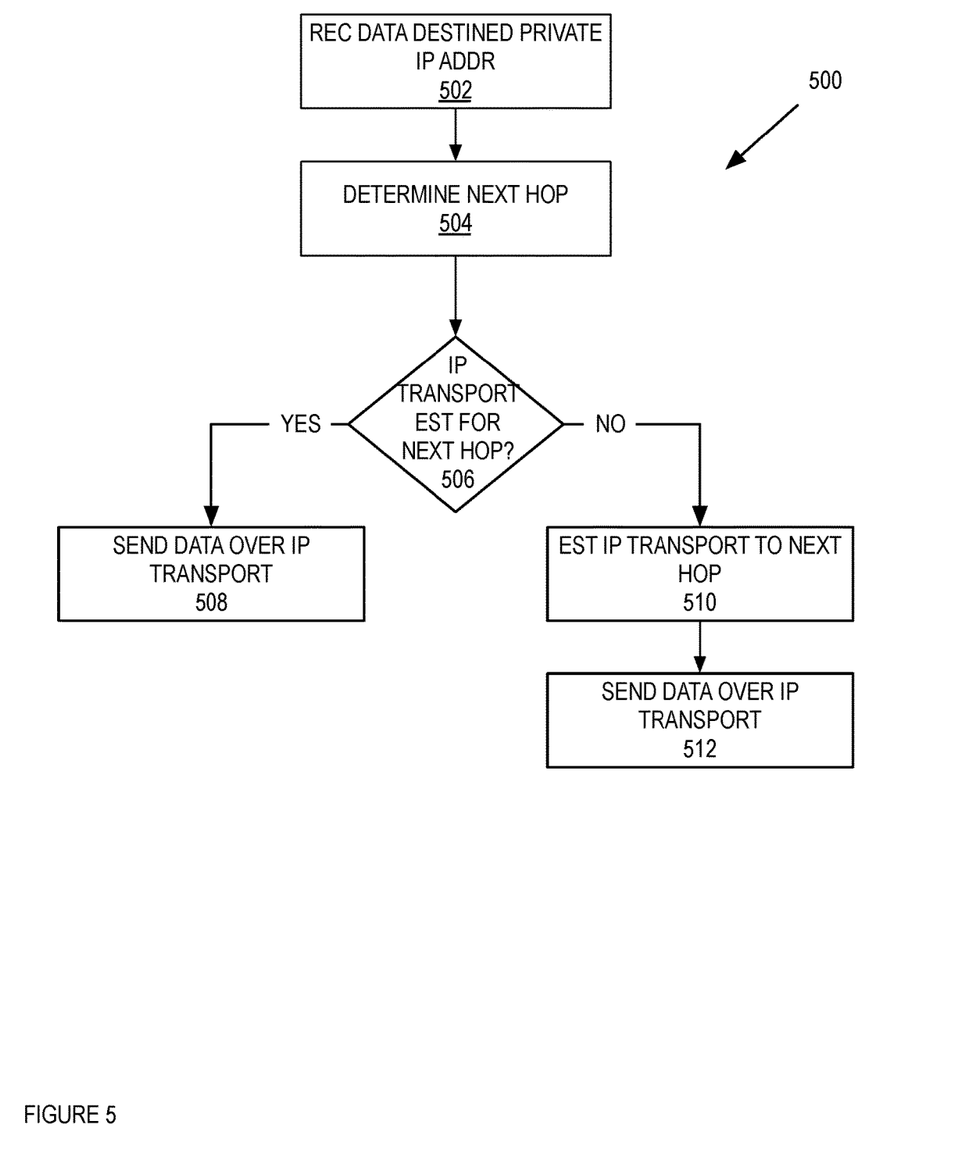
FIG. 5 is a flow diagram of one embodiment of a process to dynamically establish a tunnel between branch network elements.

FIG. 5 is a flow diagram of one embodiment of a process 500 to dynamically establish a tunnel between branch network elements. In one embodiment, process 500 is performed by an established branch tunnel module to establish a tunnel between branch network elements, such as the established branch tunnel module 220 as described in FIG. 2 above. In FIG. 5, process 500 begins by receiving data destined for a private IP address at block 502. In one embodiment, the private IP address can be one of the private networks in a different branch office. In one embodiment, the data can be a single packet with the private network destination address. Alternatively, the certain amount of flow of data over a time period to the other branch office can trigger the establishment of the secure tunnel. Data under this threshold flow would be forward to the other branch network element via the hub network element. For example and in one embodiment, if the threshold for establishing is a flow of 100 kilobytes/second (kBps) and if process 500 detects the flow of data being forwarded to a private IP prefix (e.g., branch network element 206A detects a flow of data destined for branch network 214B) that is at or above this threshold, process 500 can trigger the establishment of the dynamic secure tunnel with the branch network element peer for this IP prefix. In this embodiment, data below the threshold would be forwarded to the branch network peer via the hub network element without triggering the dynamic secure tunnel establishment.

At block 504, process 500 determines the next hop for the data. In one embodiment, process 500 looks up the destination address of the data in a FIB of the branch network element that received the data. Process 500 determines if the IP transport is established for the next hop of the data at block 506. In one embodiment, process 500 determines if the IP transport is established for the next hop of the data by determining if the next hop is a special next hop or a regular next hop. If the next hop it is a special next hop, then the IP transport is not established and execution proceeds to block 510 below. If the next hop is a regular next hop, then the IP transport is established and execution proceeds to block 508 below. At block 508, process 500 sends the data over the IP transport.

At block 510, process 500 establishes an IP transport for the next hop. In one embodiment, if the next hop is a special next hop, process 500 forces the data to be forwarded to the control plane of the branch network element. The control plan computes that the data should be forwarded to a public BGP next hop. This alerts the control plane of two things. One, the branch network element is to establish an IPSec transport session between the branch network element and the peer indicated by the special next hop, and two, that the branch element should compute a VXLAN next hop encapsulation for the peer. After the IPSec transport session is established, the control plane configures the forwarding path with the proper VXLAN tunnel and IPSec transport mode next hop information and associates this information with the IP prefixes and VPNs advertised by the specified peer. With the established IP transport, process 500 sends the data over the IP transport at block 510.

Figure 6:
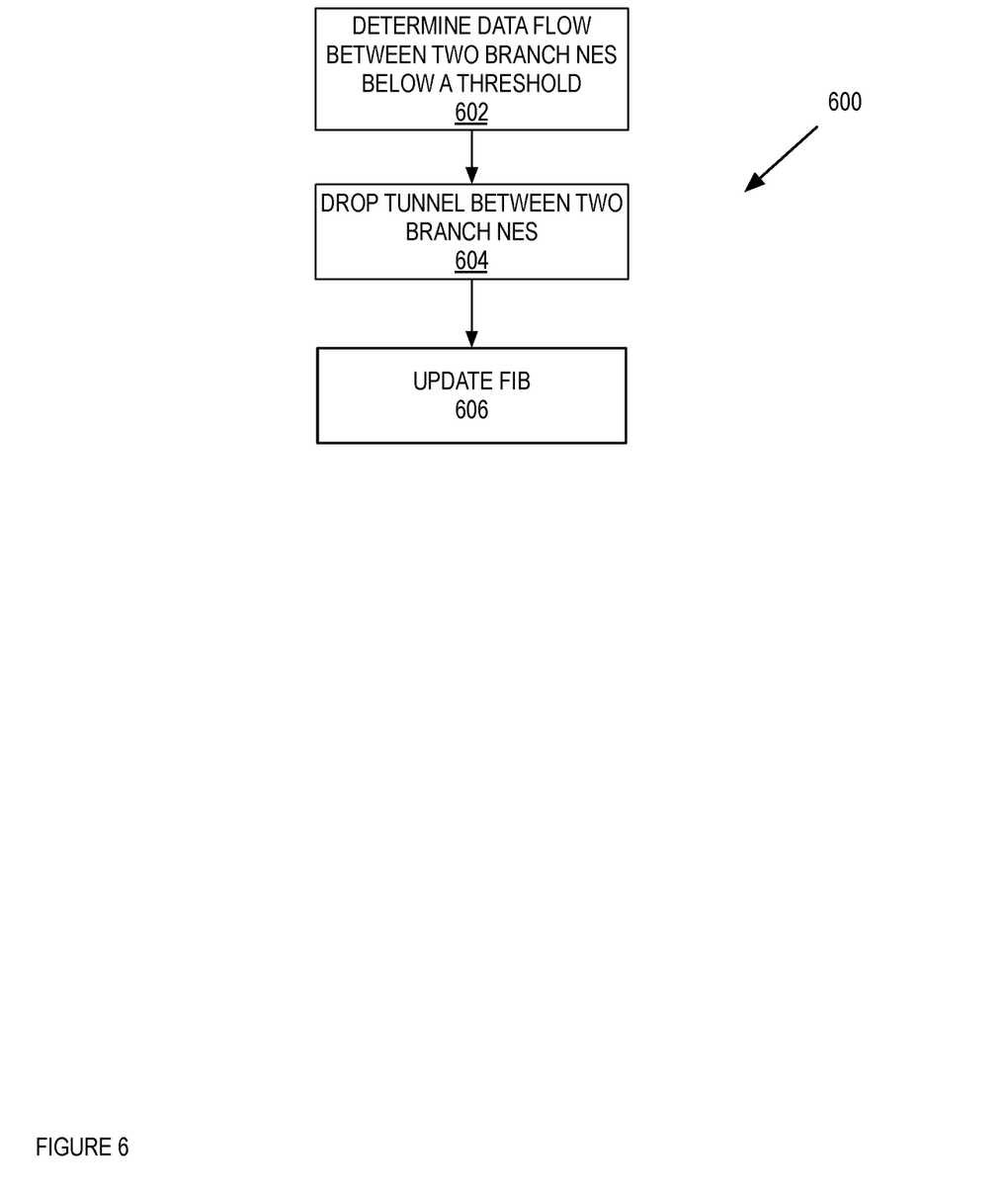
FIG. 6 is a flow diagram of one embodiment of a process to dynamically tear down a tunnel between branch network elements.

FIG. 6 is a flow diagram of one embodiment of a process 600 to dynamically tear down a tunnel between branch network elements. In one embodiment, process 600 is performed by a teardown branch tunnel module that dynamically tears down a tunnel between branch network elements, such as the teardown branch tunnel module 222 as described in FIG. 2 above. In FIG. 6, process 600 begins by determining that the data flow between the two branch network elements is below threshold. In one embodiment, the threshold can be the lack of any data communicated between these two branch network elements over a tunnel in a certain time period. Alternately, the threshold can be that if a certain amount of data is not communicated across the tunnel in a time period. At block 604, process 600 drops the tunnel between the two branch network elements. In one embodiment, if process 600 determines that there is no data across the secure tunnel after some time period (or alternatively this data flow falls below a threshold), process 600 notifies a secure tunnel manager and VXLAN managers to remove the respective security and tunnel state for the specified next-hop. In the case of IPSec, this will result in a delete request being sent to the peer where an analogous process takes place based on the receipt of this delete request. Process 600 updates the FIB at block 606. In one embodiment, process 600 replaces the next hop that indicates the other branch network element with a special next hop. In one embodiment, the special next hop is a value that indicates to the control plane that a tunnel needs to be established between the branch network elements.

Figure 7:
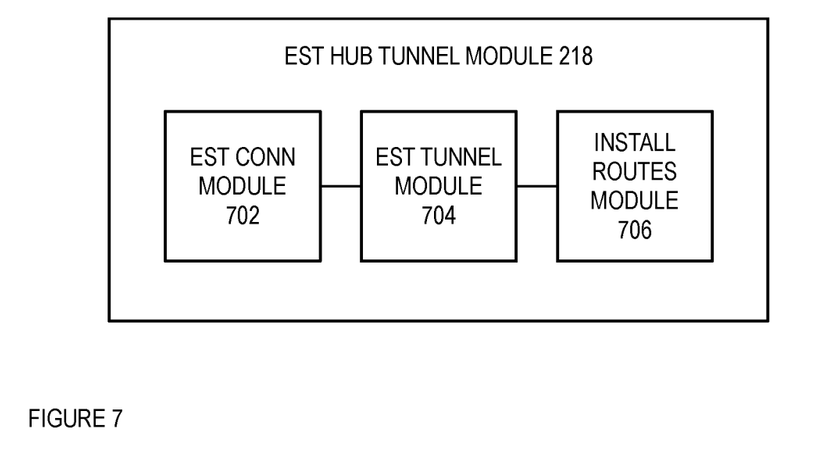
FIG. 7 is a block diagram of one embodiment of an establish hub tunnel module that establishes a tunnel between a branch network element and hub router.

FIG. 7 is a block diagram of one embodiment of an establish hub tunnel module 218 that establishes a tunnel between a branch network element and hub router. In one embodiment, the establish hub tunnel module 218 includes an establish connection module 702, establish tunnel module 704, and install routes module 706. In one embodiment, the establish connection module 702 establishes the connection between the branch network element and hub network element as described in FIG. 4, block 402 above. The establish tunnel module 704 establishes the tunnel between the branch network element in hub network, as described in FIG. 4, block 404 above. The install routes module 706 installs routes from a route reflector in the branch network element as described in FIG. 4, block 406 above.

Figure 8:
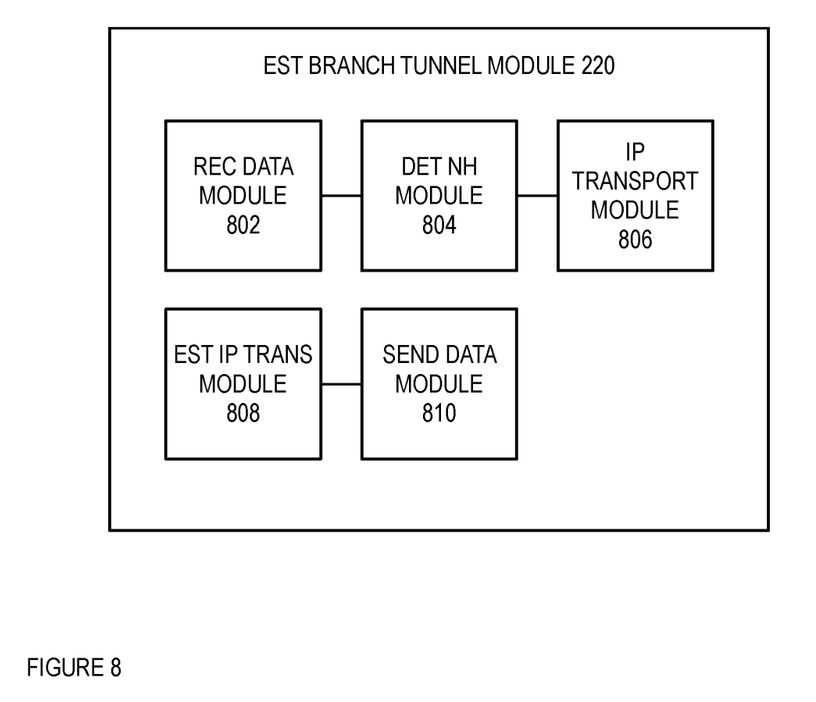
FIG. 8 is a block diagram of one embodiment of an establish branch tunnel module that establishes a tunnel between branch network elements.

FIG. 8 is a block diagram of one embodiment of an establish branch tunnel module 220 that dynamically tears down a tunnel between branch network elements. In one embodiment, the establish branch tunnel module 220 includes receive data module 802, determine next hop module 804, IP transport module 806, establish IP transport module 808, and send data module 810. In one embodiment, the received data module 802 receives data destine for a private IP address as described in FIG. 5, block 502 above. The determine next hop module 804 determines the next hop for the private IP address as described in FIG. 5, block 502 above. The IP transport module 806 determines if an IP transport has been established for the next hop as described in FIG. 5, block 506 above. The establish IP transport module 808 establishes the IP transport for a next hop as described in FIG. 5, block 510 above. The send data module 810 sends the data over the IP transport as described in FIG. 5, blocks 508 and 512 above.

Figure 9:
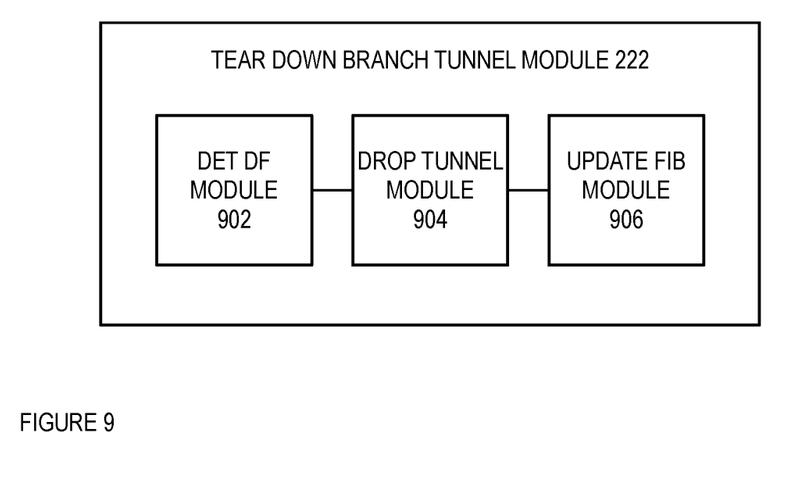
FIG. 9 is a block diagram of one embodiment of a teardown branch tunnel module that tears down a tunnel between branch network elements.

FIG. 9 is a block diagram of one embodiment of a teardown branch tunnel module 222 that tears down a tunnel between branch network elements. In one embodiment, the teardown branch tunnel module 222 includes a determine dataflow module 902, drop tunnel module 904, an update FIB module 906. In one embodiment, the determine dataflow module 902 determines that the dataflow between the two branch network elements is below a threshold as described in FIG. 6, block 602 above. The drop tunnel module 904 drops the tunnel between the two bridge network elements as described in FIG. 6, block 604 above. The update FIB module 906 updates a bridge network element FIB as described in FIG. 6, block 606 above.

Figure 10:
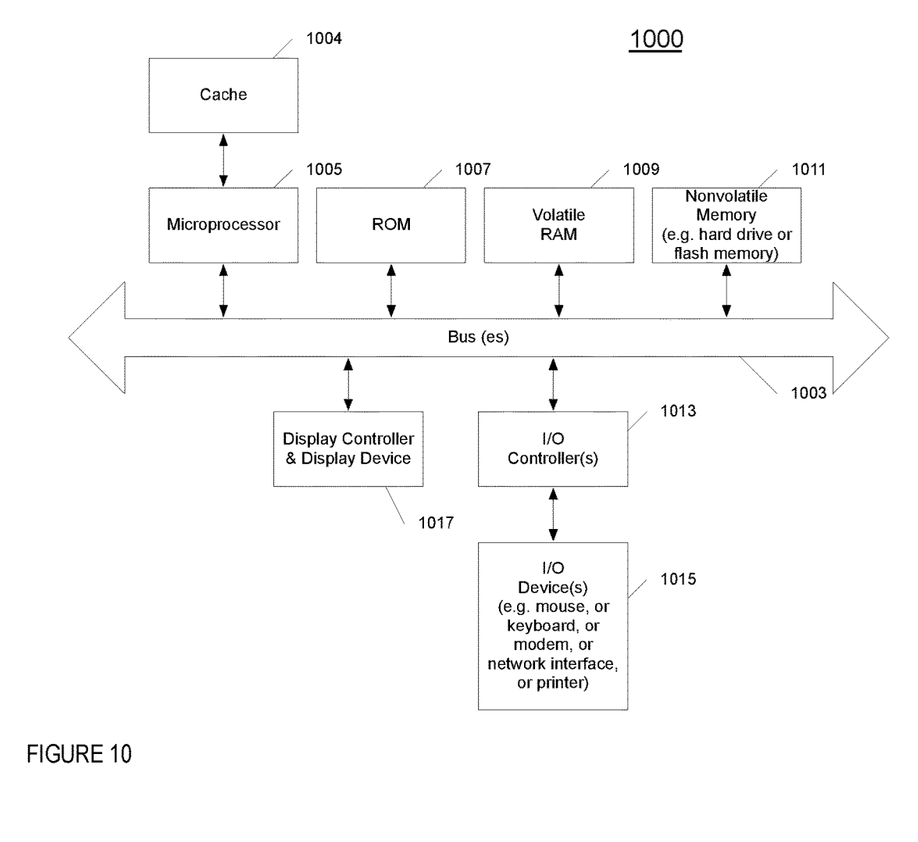
FIG. 10 illustrates one example of a typical computer system, which may be used in conjunction with the embodiments described herein.

FIG. 10 shows one example of a data processing system 1000, which may be used with one embodiment of the present invention. For example, the system 1000 may be implemented including a branch network element 206A-B as shown in FIG. 2. Note that while FIG. 10 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 10, the computer system 1000, which is a form of a data processing system, includes a bus 1003 which is coupled to a microprocessor(s) 1005 and a ROM (Read Only Memory) 1007 and volatile RAM 1009 and a non-volatile memory 1011. The microprocessor 1005 may retrieve the instructions from the memories 1007, 1009, 1011 and execute the instructions to perform operations described above. The bus 1003 interconnects these various components together and also interconnects these components 1005, 1007, 1009, and 1011 to a display controller and display device 1017 and to peripheral devices such as input/output (I/O) devices which may be mice, keyboards, modems, network interfaces, printers and other devices which are well known in the art. In one embodiment, the system 1000 includes a plurality of network interfaces of the same or different type (e.g., Ethernet copper interface, Ethernet fiber interfaces, wireless, and/or other types of network interfaces). In this embodiment, the system 1000 can include a forwarding engine to forward network date received on one interface out another interface.

Typically, the input/output devices 1015 are coupled to the system through input/output controllers 1013. The volatile RAM (Random Access Memory) 1009 is typically implemented as dynamic RAM (DRAM), which requires power continually in order to refresh or maintain the data in the memory.

The mass storage 1011 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 1011 will also be a random access memory although this is not required. While FIG. 10 shows that the mass storage 1011 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1003 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 11:
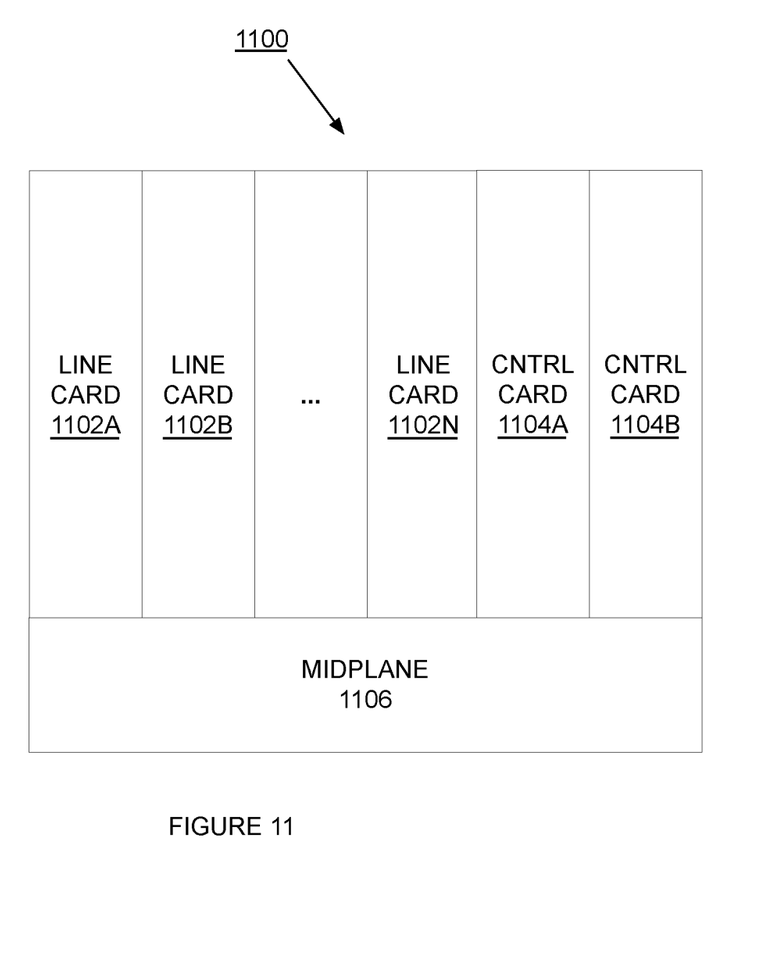
FIG. 11 is a block diagram of one embodiment of an exemplary network element that dynamically establishes or tears down tunnels between branch network elements.

FIG. 11 is a block diagram of one embodiment of an exemplary network element 1100 that dynamically establishes or tears down tunnels between branch network elements. In FIG. 11, the midplane 1106 couples to the line cards 1102A-N and controller cards 1104A-B. While in one embodiment, the controller cards 1104A-B control the processing of the traffic by the line cards 1102A-N, in alternate embodiments, the controller cards 1104A-B, perform the same and/or different functions (e.g., dynamically establishes or tear downs tunnels between branch network elements as described in FIGS. 4 and 5 above). In one embodiment, the line cards 1102A-N process and forward control plane to the controller cards 1104A-B. It should be understood that the architecture of the network element 1100 illustrated in FIG. 11 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "detecting," "determining," "establishing," "storing," "installing," "updating," "processing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to dynamically establish a first virtual private network (VPN) tunnel, the method comprising:
   detecting, with a first branch network element, data destined for a first private subnet;
   in response to the detecting, determining that a next hop for the data does not have an established VPN tunnel that allows access to the first private subnet;
   establishing the VPN tunnel from the first branch network element to a second branch network element providing access to the first private subnet, the VPN tunnel bypassing a hub network element; and
   sending the data using the VPN tunnel.

2. The machine-readable medium of claim 1, wherein the VPN tunnel is secure tunnel.

3. The machine-readable medium of claim 2, wherein the IPSec tunnel uses IPSec transport mode and the data is encapsulated for transport in the Virtual Extended Local Area Network (VXLAN).

4. The machine-readable medium of claim 1, wherein the VPN tunnel is established between the first and second branch network elements across a public Internet Protocol network.

5. The machine-readable medium of claim 1, further comprising:
   receiving, with the first branch network element, private subnet forwarding information for the first private subnet; and
   installing the private subnet forwarding information in a forwarding information base of the first branch network element.

6. The machine-readable medium of claim 5, wherein first branch network element receives the private subnet forwarding information from a route reflector.

7. The machine-readable medium of claim 5, wherein the private subnet forwarding information is distributed by Border Gateway Protocol Virtual Extended Local Area Network.

8. The machine-readable medium of claim 5, further comprising:
    establishing a second VPN tunnel between the hub network element and the first branch network element, wherein the first branch network element receives the private subnet forwarding information via the hub network element.

9. The machine-readable medium of claim 6, further comprising:
    sending a second private subnet forwarding information to the hub network element, wherein the first branch network element provides access to a device in a second private subnet.

10. The machine-readable medium of claim 1, wherein the detecting the data comprises:
    detecting that a flow of the data is at or above a threshold.

11. A method to dynamically establish a first virtual private network (VPN) tunnel, the method comprising:
    detecting, with a first branch network element, data destined for a first private subnet;
    in response to the detecting, determining that a next hop for the data does not have an established VPN tunnel that allows access to the first private subnet;
    establishing the VPN tunnel from the first branch network element to a second branch network element providing access to the first private subnet, the VPN tunnel bypassing a hub network element; and
    sending the data using the VPN tunnel.

12. The method of claim 11, wherein the VPN tunnel is secure tunnel.

13. The method of claim 12, wherein the IPSec tunnel uses IPSec transport mode and the data is encapsulated for transport in the Virtual Extended Local Area Network (VXLAN).

14. The method of claim 11, wherein the VPN tunnel is established between the first and second branch network elements across a public Internet Protocol network.

15. The method of claim 11, further comprising:
    receiving, with the first branch network element, private subnet forwarding information for the first private subnet; and
    installing the private subnet forwarding information in a forwarding information base of the first branch network element.

16. The method of claim 15, wherein first branch network element receives the private subnet forwarding information from a route reflector.

17. The method of claim 15, further comprising:
    establishing a second VPN tunnel between the hub network element and the first branch network element, wherein the first branch network element receives the private subnet forwarding information via the hub network element; and
    sending a second private subnet forwarding information to the hub network element, wherein the first branch network element provides access to a device in a second private subnet.

18. The method of claim 11, wherein the detecting the data comprises:
    detecting that a flow of the data is at or above a threshold.

* * * * *